United States Patent [19]

Farr

[11] 4,377,221
[45] Mar. 22, 1983

[54] HYDRAULIC ANTI-SKID SYSTEMS FOR VEHICLE

[75] Inventor: Glyn P. R. Farr, Warwickshire, England

[73] Assignee: Girling Limited, Birmingham, England

[21] Appl. No.: 216,792

[22] Filed: Dec. 16, 1980

Related U.S. Application Data

[62] Division of Ser. No. 941,938, Sep. 13, 1978, Pat. No. 4,260,201.

[30] Foreign Application Priority Data

Sep. 15, 1977 [GB] United Kingdom ............... 38501/77

[51] Int. Cl.³ ............................................. B60T 8/093
[52] U.S. Cl. ................................. 188/181 A; 303/116
[58] Field of Search ....................... 188/181 A, 181 R; 303/99, 113, 115, 116, 117

[56] References Cited

U.S. PATENT DOCUMENTS

| | | | |
|---|---|---|---|
| 2,904,135 | 9/1959 | Albright | 188/181 A |
| 3,666,328 | 5/1972 | Williams | 303/115 |
| 3,908,805 | 9/1975 | Morse et al. | 188/181 A |

Primary Examiner—Duane A. Reger
Attorney, Agent, or Firm—Scrivener, Clarke, Scrivener and Johnson

[57] ABSTRACT

In an hydraulic anti-skid braking system a pump having a liquid throughput which is adapted to increase with the rotational speed of the wheel is arranged to control operation of a modulator valve assembly for relieving the pressure supplied to the brake when the deceleration of a wheel exceeds a predetermined value. A sensing device for sensing the deceleration of wheel operates a control valve assembly which is provided to control the supply of operating fluid from the pump output to the modulator valve assembly.

7 Claims, 3 Drawing Figures

HYDRAULIC ANTI-SKID SYSTEMS FOR VEHICLE

SPECIFIC DESCRIPTION

This application is a division, of application Ser. No. 941,938, filed Sept. 13, 1978 now U.S. Pat. No. 4,260,201.

This invention relates generally to hydraulic anti-skid braking systems for vehicles of the kind in which the supply of operating fluid to a vehicle wheel brake is controlled by a modulator valve assembly interposed in the line between the supply and the brake and operation of the modulator valve assembly is controlled by sensing means which senses the deceleration of the wheel and operates to relieve the pressure supplied to the brake when the deceleration of the wheel exceeds a predetermined value. The present invention is also concerned with improvements in modulator valve assemblies and sensing means for such systems.

In some known anti-skid systems of the kind set forth the sensing means comprises an electronic sensor acting on a solenoid operated valve which controls the application of a control pressure from a power supply to operate the modulator valve assembly. These systems generally have separate power supplies to apply the brakes and some incorporate an accumulator to re-apply the brakes when the pressure falls below a certain value. These known systems are all relatively complicated and expensive, and are only practical for use on commercial or luxury vehicles.

According to our invention in an hydraulic anti-skid system of the kind set forth a pump having a liquid throughput adapted to increase with the rotational speed of the wheel is arranged to control operation of the modulator valve assembly, and a control valve adapted to be operated by the sensing means is provided to control the supply of operating fluid from the pump output to the modulator valve assembly.

This system therefore provides a simple, self-powered, anti-skid device which may be used with a conventional braking system. It is particularly suitable for use in the braking system of motor cycles and small cars. The pump delivery is dependent, suitably proportional, to wheel speed, and instantaneous wheel speed during skid recovery is dependent upon the wheel acceleration achieved and upon the drop in wheel speed during skid detection. It follows therefore that the rate at which the modulator valve assembly is actuated to re-apply the brakes is determined indirectly by the wheel acceleration. The system is therefore efficient when the vehicle is in use on a slippery surface as the wheel acceleration, and hence the brake re-application, will be slow. This is an improvement over previous systems where an accumulator determined the brake re-application and the brakes could be re-applied too quickly under slippery conditions.

Preferably the sensing means is adapted to be driven by the vehicle wheel.

The sensing means preferably comprises an inertia wheel driven through an expander mechanism which acts on the control valve such that when the torque on the inertia wheel due to deceleration of the vehicle wheel exceeds a value equivalent to the predetermined value of the deceleration the expander mechanism is operated and acts to operate the control valve. The inertia wheel may be driven through a one-way drive, for example a one-way spring loaded or roller clutch.

The expander mechanism, which may comprise a ball and ramp expander, preferably acts to operate the control valve through a spring-loaded lever.

Conveniently the modulator valve assembly comprises a piston assembly adapted to vary the effective volume of a chamber interposed between the supply and the brake and to control operation of a brake inlet valve, and the piston assembly is exposed on one side of the braking pressure and on the other side to the supply of operating fluid from the pump output which normally urges the piston assembly into a first position in which the brake inlet valve is open and the effective volume of the chamber is at a minimum value, and the control valve is operated when the deceleration exceeds the predetermined value to connect the pump output to a reservoir for hydraulic fluid so that the pump pressure is released to allow the piston assembly to move into a second position in which the brake inlet valve is closed to disconnect the braking pressure supply from the brake and the effective volume of the chamber is greater than the minimum value so that the pressure hydraulic fluid in a line between the chamber and the brake is reduced.

The modulator valve assembly may incorporate a restriction controlled by the braking pressure and through which the pump output is connected to a reservoir for hydraulic fluid to increase the pump pressure on the upstream side of the restriction when the brakes are applied and the deceleration is below the predetermined value.

An embodiment of the invention is illustrated in the accompanying drawings, in which.

Figure 1:
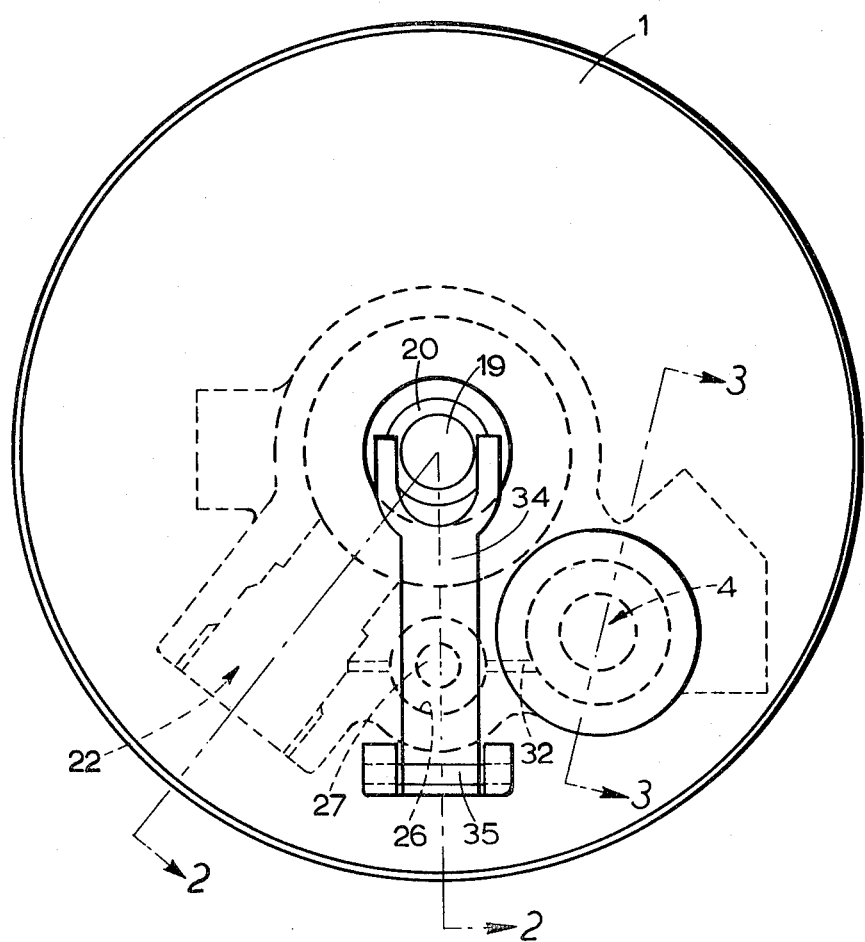
FIG. 1 is an end plan view of an hydraulic anti-skid system.

In the anti-skid system illustrated in the drawings a housing 1 is mounted on the frame of a vehicle (not shown) and a reservoir 2 for hydraulic fluid is mounted above the housing 1.

Figure 3:
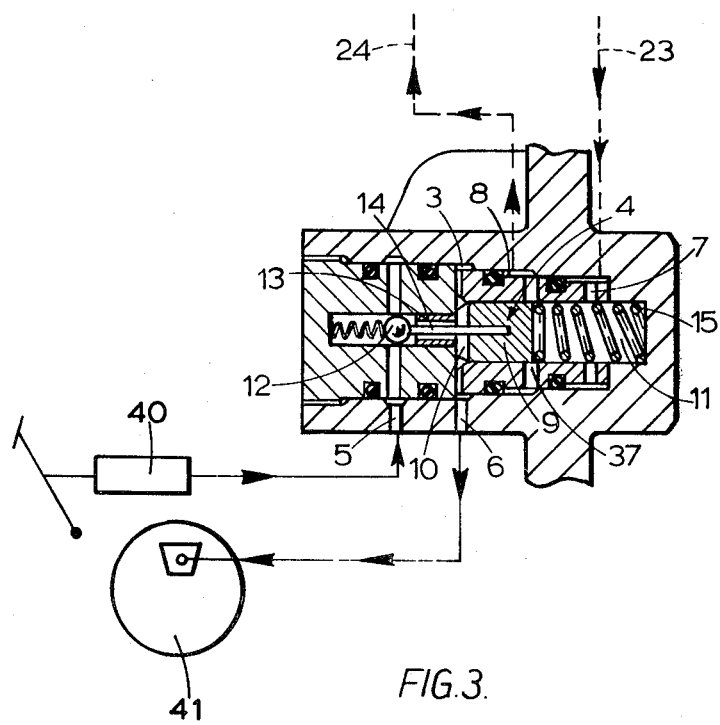
FIG. 3 is a section on the line 3—3 of FIG. 1.

As shown in FIG. 3, the housing 1 is provided with a first longitudinally extending stepped bore 3 in which a modulator valve assemby 4 is located for controlling the communication between a first inlet 5 and a first outlet 6, and between a second inlet 7 and a second outlet 8 of the bore. The valve assembly 4 comprises a piston 9 working in a larger diameter portion of the bore to define respective variable volume chambers 10 and 11 at its opposite ends and a ball valve member 12 working in another bore portion and engageable with a seating 13 to cut off communication between the first inlet 5 and an outlet 6 which are connected to a supply of brake operating fluid from a master cylinder assembly 40 and to a vehicle wheel brake 41, respectively. A stem 14 projecting from the one end of the piston 9 acts on the ball valve member 12, and a spring 15 acting on the opposite end of the piston 9 and housed in the chamber 11 urges the ball valve into its open position as shown in FIG. 3.

Figure 2:
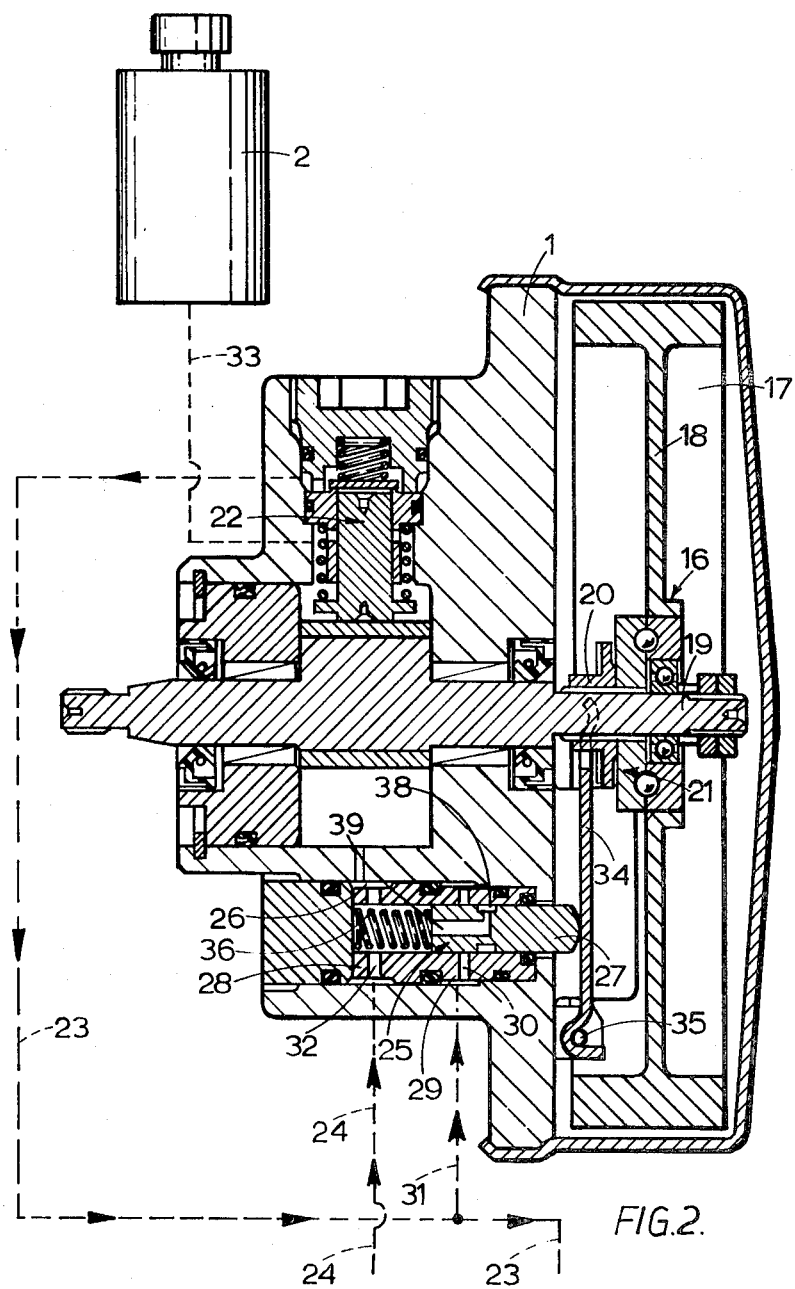
FIG. 2 is a section on the line 2—2 of FIG. 1.

Sensing means 16 for sensing the deceleration of a braked wheel is located in a chamber 17 in the housing 1 as shown in FIG. 2 and comprises a flywheel 18 driven by a shaft 19 through a clutch member 20 and a ball and ramp expander mechanism 21. The shaft 19 is itself driven by the vehicle wheel and operates a pump 22 located in another part of the housing 1 and which is arranged to withdraw liquid from the reservoir 2 so that the liquid throughput of the pump 22 will increase with the wheel rotational speed. The pump normally circulates liquid through the modulator valve assembly 4 along the line 23 and back to the reservoir along the line 24 and through a control valve assembly 25 located in a second stepped bore 26 in the housing.

The control valve assembly 25 comprises a spool member 27 working in a bore 28 in a sleeve 29 to control communication between a first radial passage 30 in the sleeve which is connected to the pump output along a line 31 and a second radial passage 32 which is connected to the reservoir 2 via a line 33. A lever 34 pivotally mounted at 35 acts on the clutch member 20 at its free end and acts on an outer end of the spool member 27 at an intermediate point in its length. A return spring 36 acts on the other end of the spool member 27 to bias the clutch member 20 into operative engagement with the flywheel 18 through the lever 34.

When the vehicle is in motion the shaft 19 is driven by the wheel and rotates and drives the flywheel 18 via the clutch member 20 and the ball and ramp mechanism 21. At the same time the shaft 19 operates the pump 22 and fluid is circulated by the pump through the modulator valve assembly 4.

When the brake is applied fluid from the master cylinder is fed to the brake via the open ball valve 12 and the chamber 10, which is at a minimum volume with the piston 9 in the position shown in FIG. 3, and acts on the piston 9 urging it to the right. The end of the piston 9 then defines a restriction 37 in the path between the lines 24 and 23, and this causes the pressure on the pump side of the restriction to rise to balance the pressure applied to the brake.

If the applied brake pressure is too high and the vehicle wheel starts to decelerate rapidly, the flywheel 18 at, say, 1 g deceleration provides enough torque to expand the ball and ramp mechanism 21 against the load in the control valve spring 36 acting through the lever 34. The flywheel 18 continues to overrun against the friction of the clutch member 20 at, say 1.2 g. Expansion of the ball and ramp mechanism 21 urges the spool member 27 to the left to connect the pump output directly to the reservoir via the radial passage 30, an annular chamber 38 in the spool member and a passageway 39 communicating with the radial passage 32. Release of the pump pressure acting on the modulator valve piston 9 immediately results in the piston shooting to the right, closing the ball valve 12 to cut off the master cylinder from the brakes, and expanding the volume of the chamber 10, which increases the brake volume to reduce the brake pressure and allow wheel acceleration.

When the wheel reaches the speed of the flywheel 18 the ball and ramp mechanism 20 is loaded together by the spring 36 and the spool member 27 moves back into its closed position to cut off the pump outlet from the reservoir and allow the pump pressure to rise. This pressure acting on the piston 9 urges it back to the left to open the ball valve 12 and the restriction 37 is again opened so that the pump pressure increases to balance the brake pressure acting at the opposite end of the piston 9.

When the brakes are applied without rotation of the drive shaft 19, i.e. if the vehicle is stationary; or the pump has failed, the brake pressure forces the piston 9 to the right until the restriction 37 connecting the pump to the reservoir 2 is closed. Fluid in the chamber 11 is then trapped by the closed control valve spool member 27 and prevents further travel of the piston 9 so that the ball valve 12 remains open and the brakes can be applied normally.

If the master cylinder pressure is released while the ball valve 12 is closed, the ball valve will open to permit brake pressure release once the master cylinder pressure falls below the brake pressure.

I claim:

1. Anti-skid sensing means for a vehicle braking system of the type comprising a fluid pressure-operable brake for braking a wheel, a supply of fluid under pressure for operating said brake, a modulator assembly for modulating said supply of fluid to said brake in accordance with a skid signal from anti-skid sensing means, said anti-skid sensing means comprising a shaft adapted to be driven by said wheel, a flywheel assembly including relatively movable parts, all said parts being mounted on said shaft for full rotation with respect to said shaft, drive means including a clutch and through which said flywheel assembly is driven from said shaft, camming means responsive to relative angular movement between said shaft and said flywheel assembly to produce a skid signal for operating said modulator assembly to reduce the pressure of fluid supplied to said brake when the deceleration of said shaft relative to said flywheel assembly exceeds a predetermined value, said skid signal comprising relative axial movement between said shaft and said flywheel assembly, common biassing means for biassing both said clutch and said camming means, a reaction means for transmitting thrust from said biassing means to said flywheel assembly, and means for positively driving said reaction means from said wheel at all times, wherein said biasing means exerts a biassing force on said clutch and camming means which prevents said skid signal from being produced unless said flywheel assembly has generated sufficient torque to overrun said shaft by a predetermined amount and to maintain said skid signal by permitting said flywheel assembly to overrun said shaft against said clutch.

2. Anti-skid sensing means as claimed in claim 1, wherein said clutch comprises said drive means.

3. Anti-skid sensing means as claimed in claim 1, wherein said flywheel assembly comprises a flywheel member, a thrust member, and means for keying one of said members against axial movement with respect to said shaft.

4. Anti-skid sensing means as claimed in claim 3, wherein said biassing means comprises a spring, and a lever is incorporated through which said spring acts on said clutch plate and through which said skid signal is adapted to be transmitted to said modulator assembly.

5. Anti-skid sensing means as claimed in claim 3, wherein said flywheel member is keyed against axial movement with respect to said shaft, said thrust member is both axially and angularly movable, and said clutch plate is urged into frictional engagement with said thrust member by said biassing means.

6. A vehicle braking system comprising a fluid pressure-operable brake for braking a wheel, a supply of fluid under pressure for operating said brake, anti-skid sensing means for producing a skid signal, and a modulator assembly for modulating said supply of fluid to said brake in accordance with said skid signal from said anti-skid sensing means, wherein said anti-skid sensing means comprises a shaft adapted to be driven by said wheel, a flywheel assembly including relatively movable parts, all said parts being mounted on said shaft for rotation with respect to said shaft, drive means including a clutch and through which said flywheel assembly is driven from said shaft, camming means responsive to relative angular movement between said shaft and said flywheel assembly to produce said skid signal for operating said modulator assemby to reduce the pressure of fluid supplied to said brake when the deceleration of said shaft relative to said flywheel assembly exceeds a predetermined value, said skid signal comprising relative axial movement between said shaft and said flywheel assembly, common biassing means for biassing both said clutch and said camming means, a reaction means for transmitting thrust from said biassing means to said flywheel assembly, and means for positively driving said reaction means from said wheel at alltimes, said biassing means exerting a biassing force on said clutch and camming means to prevent said skid signal from being produced unless said flywheel assembly has generated sufficient torque to overrun said shaft by a predetermined amount and to maintain said skid signal by permitting said flywheel assembly to overrun said shaft against said clutch.

7. Anti-skid sensing means as claimed in claim 3, wherein said camming means comprises a ball and ramp mechanism located between said members to cause axial movement of the other of said members with respect to said shaft in response to relative angular movement between said members, and said clutch comprises a clutch plate constituted by said reaction means and having a frictional engagement with the said other of said members and of which the magnitude is determined by the magnitude of said biassing means, the said other of said members being angularly movable with respect to said clutch plate upon said frictional engagement being overcome by overrun of said flywheel member with respect to said shaft, whereby axial movement of the said other member in a direction away from the said one member in response to relative angular movement between said members produces said skid signal with any additional overrun of said flywheel member with respect to said shaft overcoming said frictional engagement to maintain said skid signal.

* * * * *